Patented Jan. 23, 1934

1,944,730

UNITED STATES PATENT OFFICE 1,944,730

COMPOSITION FOR DIELECTRIC USE

Frank M. Clark, Pittsfield, Mass., assignor to General Electric Company, a corporation of New York No Drawing. Application May 28, 1932
Serial No. 614,196

2 Claims. (Cl. 252—1)

The present application is a continuation in part of my prior application Serial No. 527,204, filed April 2, 1931, (U. S. Patent 1,931,455 patented October 17, 1933) and its subject is a new composition of liquid halogenated benzene which is suitable for use as a dielectric material, either alone, or in conjunction with paper, cloth, or other non-conducting solid materials in electric devices, such for example, as transformers, cables, bushings, capacitors, switches, fuses, and the like.

Heretofore, mineral oil, a paraffinic or naphthenic hydrocarbon, has been most commonly used when a liquid dielectric material was desired. However, some of the properties of mineral oil constitute a serious disadvantage in electrical apparatus. For example, mineral oil not only is inflammable, but also when subjected to the decomposing influence of an electric arc gives off inflammable gases which are explosive when mixed with air. In some instances dangerous explosions have occurred in transformers. Mineral oil also tends to become partially oxidized or sludged during use and then must be replaced. Its dielectric constant is relatively low, being about 2.2. As will be later explained, mineral oil tends to absorb water from the atmosphere and thereby becomes depreciated as a dielectric material.

A liquid material free from these disadvantageous properties of mineral oil and possessing desirable electrical and other characteristics for use as a dielectric medium in electrical apparatus has long been sought in the electrical art. Various materials suggested as substitutes for oil have been found unsuitable. In some cases such materials proved to be chemically unstable under working conditions and attacked metal and other materials in the devices in which they were used. In other cases the dielectric properties proved to be poor. In other cases deleterious or explosive gases were evolved under service conditions. In some cases the above mentioned and other undesirable properties occur in combination.

I have discovered that compositions of halogenated benzene, and in particular trichlor benzene, possess the desired combination of properties required for dielectric media. When such compositions are made up of different isomers they are liquid in the range of temperatures occurring in electrical devices. Halogenated benzene has sufficient chemical stability to permit copper and other chemically reactive metals to be unattacked by the halogen element even under the conditions of electric stress existing in electric devices. It is non-combustible in the usual sense. Furthermore, halogenated benzene containing halogen and hydrogen in properly chosen proportions generates only non-combustible gas or gases when subjected to the influence of an electric arc. It is non-sludging, has a high dielectric constant and has a combination of various other advantageous properties hereinafter described, which render it peculiarly adapted for insulating and cooling purposes in electrical devices. The gas given off by chlorinated benzene consists either wholly, or substantially so, of hydrogen chloride. Similarly, benzene containing a fluorine, bromine or other halogen, in proper proportion when subjected to an electric arc generate the respective halogen hydride. Such compounds may be used within the scope of my invention, halogen hydrides as a class being non-combustible. They may be absorbed by chemical combination with alkaline materials, and dissolved in water and other liquids.

Trichlor benzene, which is an example of my invention, preferably is used as a mixture of its isomers prepared by the direct chlorination of benzene with a catalyst, such, for example, as iron, antimony, or iodine. Benzene may be chlorinated by well-understood methods to a specific gravity of about 1.40. The dichlor benzene which is incidentally formed is separated by fractional distillation. The trichlor benzene fraction desired has a specific gravity of about 1.46 at 15° C. This liquid is filtered through fuller's earth until its electrical properties are satisfactory. The dichloride need not be discarded as it may be rechlorinated. Liquid trichlor benzene thus made is constituted of a mixture of isomeric chlorine compounds, that is, compounds in which the chlorine radicals have unlike arrangements in the molecule. Such a mixture has a viscosity of 30 seconds Saybolt at 50° C. and becomes solidified at about 5° C. It is substantially non-volatile at temperatures up to 100° C. and hence will not appreciably evaporate in electric devices operated with a liquid dielectric. It is stable chemically. Trichlor benzene has a dielectric constant at room temperature of about 5. Trichlor benzene because of its low viscosity is of especial value in transformers and other electrical apparatus in which free flow of the liquid is desired, either for heat dissipation or for mechanical reasons, as in a switch. The specific gravity of trichlor benzene is about 1.45 at 25° C. In practical distillation it may be associated with some dichlorbenzene or some tetrachlor benzene, or both. I prefer to collect fractions having a specific gravity between the limits of about 1.43 and 1.48. The resulting trichlorbenzene mixture has an average specific gravity at 15° C. of about 1.46. Trichlorbenzene has a dielectric strength of about 35 KV. or higher at room temperature and shows no pronounced tendency to lower dielectric strength at temperatures as high as 100° C. Its resistivity at 100° C. is $200\times10^9$ volts per c. m. cube.

The rate of de-emulsification of water from trichlor benzene is materially greater than the rate for transformer oil. For example, at the end of forty seconds about thirty-five per cent of emulsified water separates from the oil and about ninety per cent of emulsified water separates from the trichlor benzene. This difference becomes more pronounced in service use. Mineral oil on oxidation shows more pronounced tendency toward emulsification. Trichlor benzene stays substantially unchanged. Liquid chlorinated benzene dissolves air only to the extent of 5 to 6 per cent by volume. Mineral oil, such as used for dielectric purposes in transformers, capacitors, cables, etc. dissolves air to the extent of about 10 per cent. The tendency to create gas pockets in the insulation, which will result in decreased dielectric strength and ultimate failure, is increased as the dissolved gas content of the insulating liquid increases.

Trichlor benzene having equal molecular proportions of chlorine and hydrogen is non-inflammable and such gases as are evolved by an arc are small in quantity and non-combustible and non-explosive.

For many purposes of my invention, as described in my prior U. S. Patent 1,931,455 it is advantageous to employ a mixture of pentachlor diphenyl and trichlor benzene, preferably in substantially equal proportions by weight. Such a mixture possesses the properties of a super-cooled liquid which is still capable of being poured at a temperature as low as $-48°$ C.

The dielectric constant of a mixture of a pentachlor diphenyl and trichlor benzene regardless of proportion is about 5. Such a high constant results in a better equalization of electric strains in electric devices than is afforded with mineral oil. Electrical creepage tests show the mixture to be substantially twice as good an insulator as mineral oil, also regardless of proportions. It has a lower affinity for water than mineral oil. An emulsion of water in a mixture of equal parts of pentachlor diphenyl and trichlor benzene becomes de-emulsified in 60 seconds to the extent of about 90%.

All such mixtures have a materially lower solubility for air, or other gas, than mineral oil. As compared with mineral oil, such as employed in transformers, the improvements in the case of the equal parts mixture is about 60%.

The halogenated mixture is materially less viscous than mineral oil at a given temperature, and therefore is better suited as a cooling medium. Expansion of such a mixture, due to changes of temperature, is less than the expansion of mineral oil of the same temperature range.

When either trichlor benzene, or a mixture of chlorination compounds of benzene, as herein described, is subjected to an electric arc, the gas given off is substantially solely hydrogen chloride. Hydrogen chloride gas may be readily absorbed by alkaline chemical reagents, such as soda lime, as described in my prior Patents 1,931,373 and 1,931,455, and claimed in my co-pending application Serial No. 689,426, filed September 14, 1933.

Either a mixture of isomers of trichlor benzene, or a mixture of pentachlor diphenyl and trichlor benzene shows less loss of material from the electrodes of an electric switch when subjected to the arc produced when breaking a circuit than observed under similar conditions in mineral oil. Materially less gas is given off for a given amount of arcing in trichlor benzene than in mineral oil. For mixtures of trichlor benzene and pentachlor diphenyl the amount of gas given off is less than in the case of mineral oil. I have found in a given case a given amount of arcing in trichlor benzene liberated two cubic centimeters of gas; and in an equal parts mixture of the above liberated five or six cubic centimeters of gas.

Hexachlor diphenyl may be employed advantageously in combination with trichlor benzene, preferably in 50:50 proportions by weight. Such mixtures possess essentially the same physical characteristics as described above in connection with the pentachlor diphenyl mixtures with trichlor benzene. Such a mixture may be used as a dielectric liquid for transformers, cables, capacitors and other apparatus containing carbonizable materials.

In some cases equimolecular mixtures of hexachlor diphenyl and dichlor benzene may be employed. The dichlor benzene, however, is more volatile than the trichlor benzene, boiling at about 170° C. and hence such a mixture is less advantageous in the case of apparatus operating at elevated temperatures. The excess of chlorine from the hexachlor diphenyl combines with the excess hydrogen from the dichlor benzene under arcing conditions and produces a non-explosive gas consisting essentially of hydrogen chloride.

While the previous examples described mainly dielectric media consisting of chlorinated products, other halogenated products may be used for the purpose of my invention. Mixed halogenated materials may be employed.

When employing halogenated aryl hydrocarbons in electrical devices, such as transformers or cables which contain also other insulating materials, such as resins, asphalts, oil varnishes, gums or the like, care should be exercised to exclude such materials as are attacked by the halogenated liquid. For example, the asphalts and oil varnishes should not be used. Synthetic resins, such as the phenolic or alkyl resins (poly-hydric alcohol-poly-basic acid resins), and the copal gums may be safely used as impregnating or coating materials.

What I claim as new and desire to secure by Letters Patent of the United States is:

1. A dielectric material comprising mainly liquid chlorinated benzene, said material having a solidification temperature at least as low as 5° C. having a specific gravity between the limits of about 1.43 and 1.48 and being characterized by chemical stability, high dielectric constant and resistivity, and the chlorine content thereof being in such proportion to the hydrogen content as to yield only substantially non-inflammable gas upon being thermally or electrically decomposed.

2. A chemically stable composition consisting essentially of a mixture of isomers of trichlor benzene, said composition being a liquid at temperatures as low as 5° C. having a viscosity of about 30 seconds Saybolt at 50° C., a dielectric constant at room temperature of about 5, and evolving only non-inflammable and non-explosive gas when decomposed by an electric arc.

FRANK M. CLARK.

CERTIFICATE OF CORRECTION.

Patent No. 1,944,730.

January 23, 1934.

FRANK M. CLARK.

It is hereby certified that error appears in the printed specification of the above numbered patent requiring correction as follows: Page 1, line 68, strike out the article "a"; page 2, line 126, for "alkyl" read alkyd; and that the said Letters Patent should be read with these corrections therein that the same may conform to the record of the case in the Patent Office.

Signed and sealed this 13th day of March, A. D. 1934.

F. M. Hopkins (Seal)

Acting Commissioner of Patents.